United States Patent [19]

Houpt

[11] 4,171,541

[45] Oct. 16, 1979

[54] MODULAR PROGRAMMABLE CONTROLLING SYSTEM

[75] Inventor: Grover K. Houpt, Wayne, Pa.

[73] Assignee: American Manufacturing Company, Inc., King of Prussia, Pa.

[21] Appl. No.: 715,414

[22] Filed: Aug. 18, 1976

[51] Int. Cl.$^2$ .................. G05B 19/02; G05B 23/02
[52] U.S. Cl. .................................. 364/900; 339/18 B
[58] Field of Search ........................ 340/372; 364/900 MS File, 200 MS File; 339/17 B, 17 C, 17 R, 17 M, 17 N, 17 LC, 113 L, 113 R, 113 B, 18 B, 18 R; 361/393, 400

[56] References Cited

U.S. PATENT DOCUMENTS

| | | | |
|---|---|---|---|
| 3,241,000 | 3/1966 | Rosyln, Jr. | 339/18 R |
| 3,267,407 | 8/1966 | Humphries et al. | 339/18 R |
| 3,386,010 | 5/1968 | Nojiri | 361/393 X |
| 3,524,198 | 8/1970 | Malmstadt et al. | 339/17 N |
| 3,942,077 | 3/1976 | Powers | 361/393 X |
| 3,961,200 | 6/1976 | Dute | 364/900 X |
| 3,986,170 | 10/1976 | Valassis et al. | 364/200 |

Primary Examiner—Gareth D. Shaw
Assistant Examiner—Thomas M. Heckler
Attorney, Agent, or Firm—Nelson E. Kimmelman; Edward M. Farrell

[57] ABSTRACT

An indicating system has a left input section to which electrical leads from relatively high voltage apparatus in the field are coupled. The input section includes a number of horizontal input circuit boards which are electrically connected with a central "logic" section having a number of horizontal logic subassemblies. Each subassembly comprises a "daughter board" with subcircuits thereon which simulate the action of a number of sets of relay switch contacts and the action of a coil which "controls" the respective states of certain ones of the sets of contacts. The central logic section is connected to a right output section comprising a number of vertically-spaced, horizontal output circuit boards which isolate the logic section from the voltages in the valves, motors, etc. in the field that are controlled thereby.

A plurality of modules are provided which may be manually slipped onto the front edge of the "daughter board", each module bearing a symbol representing a component of a conventional ladder diagram. When it is pressed inward onto the front edge of the daughter board, it may have a portion which cooperates with one or more of the logic subcircuits thereupon, causing that subcircuit to simulate the operation corresponding to the symbol on the module. The module symbols and vertical lines on the left and right sections create a conventional ladder diagram whose operation is electrically simulated by the central logic section's subcircuits.

16 Claims, 13 Drawing Figures

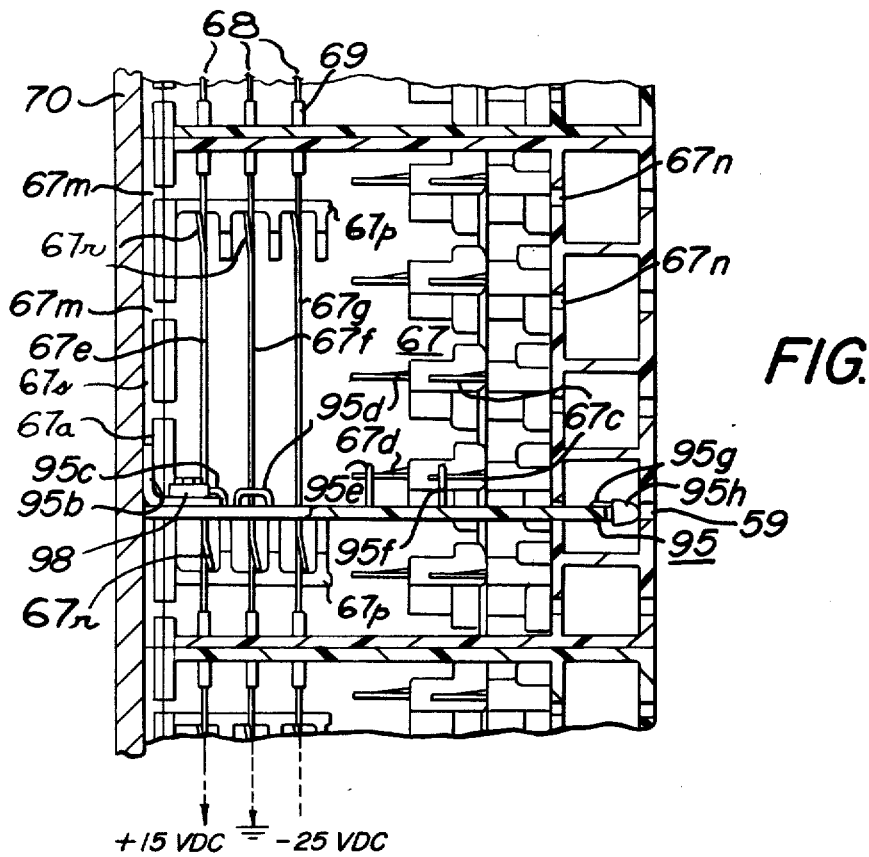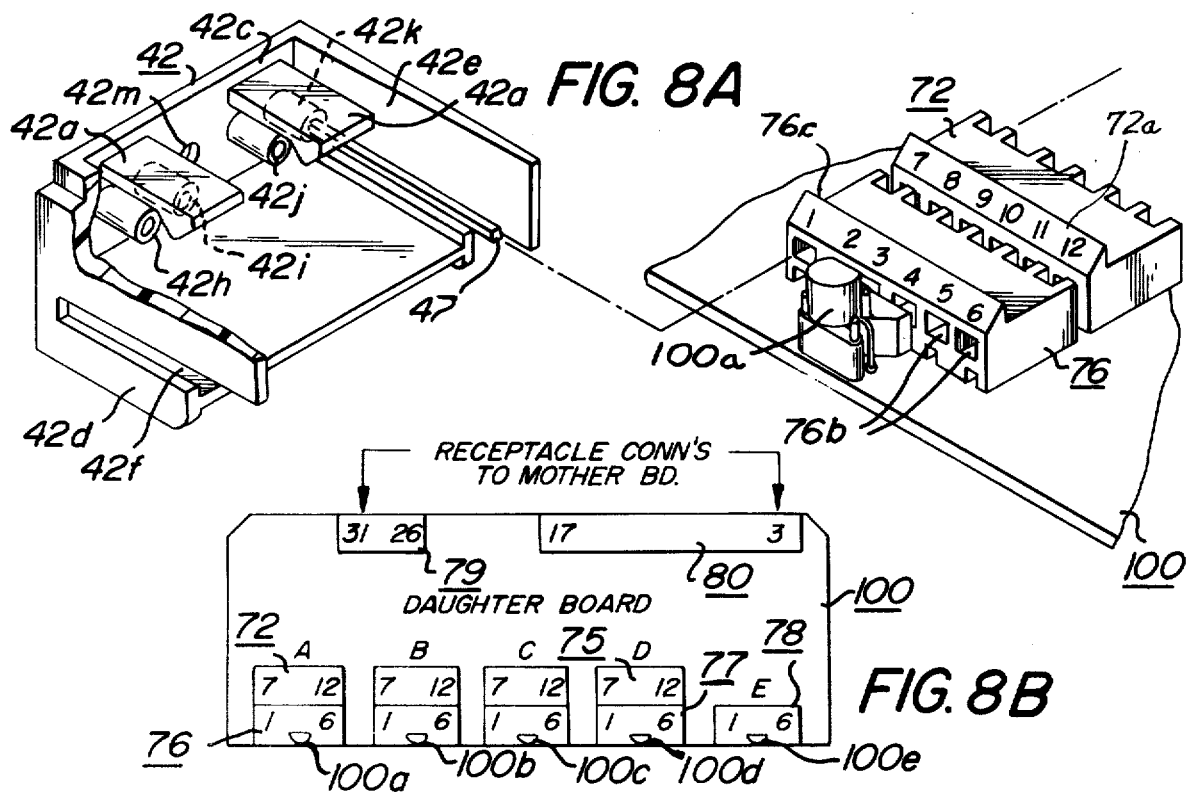

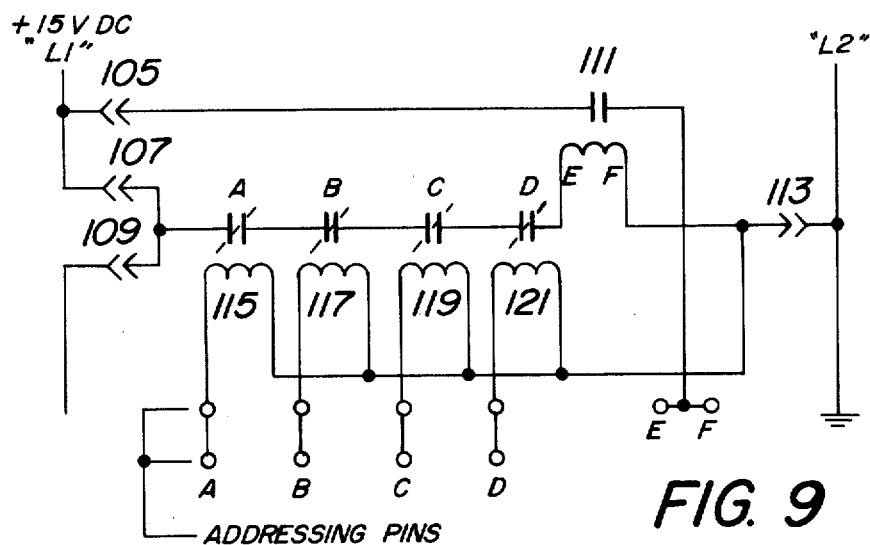
FIG. 9
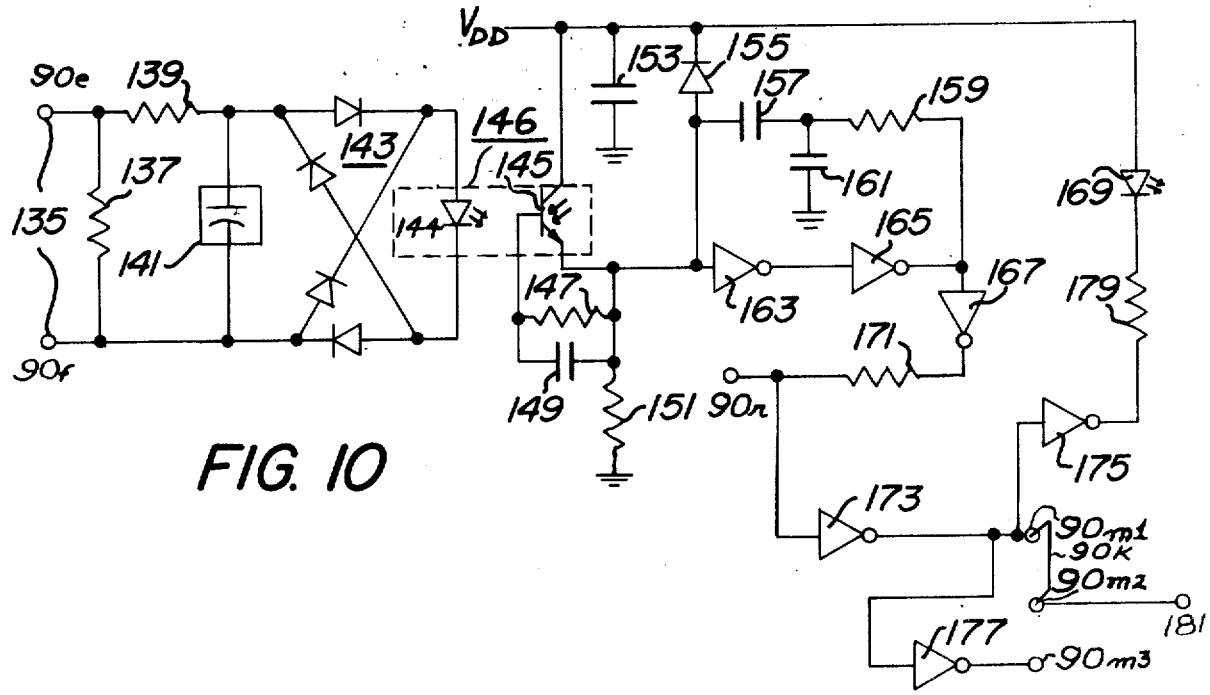
FIG. 10
FIG. 11
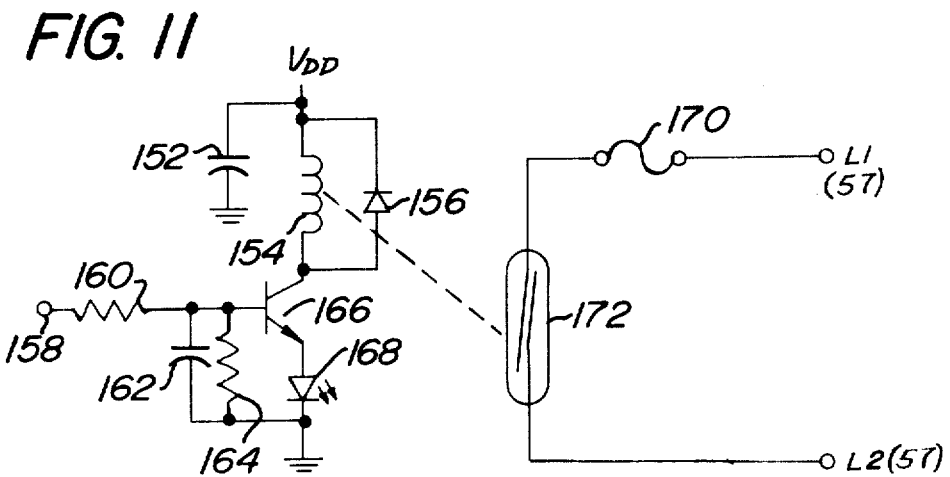

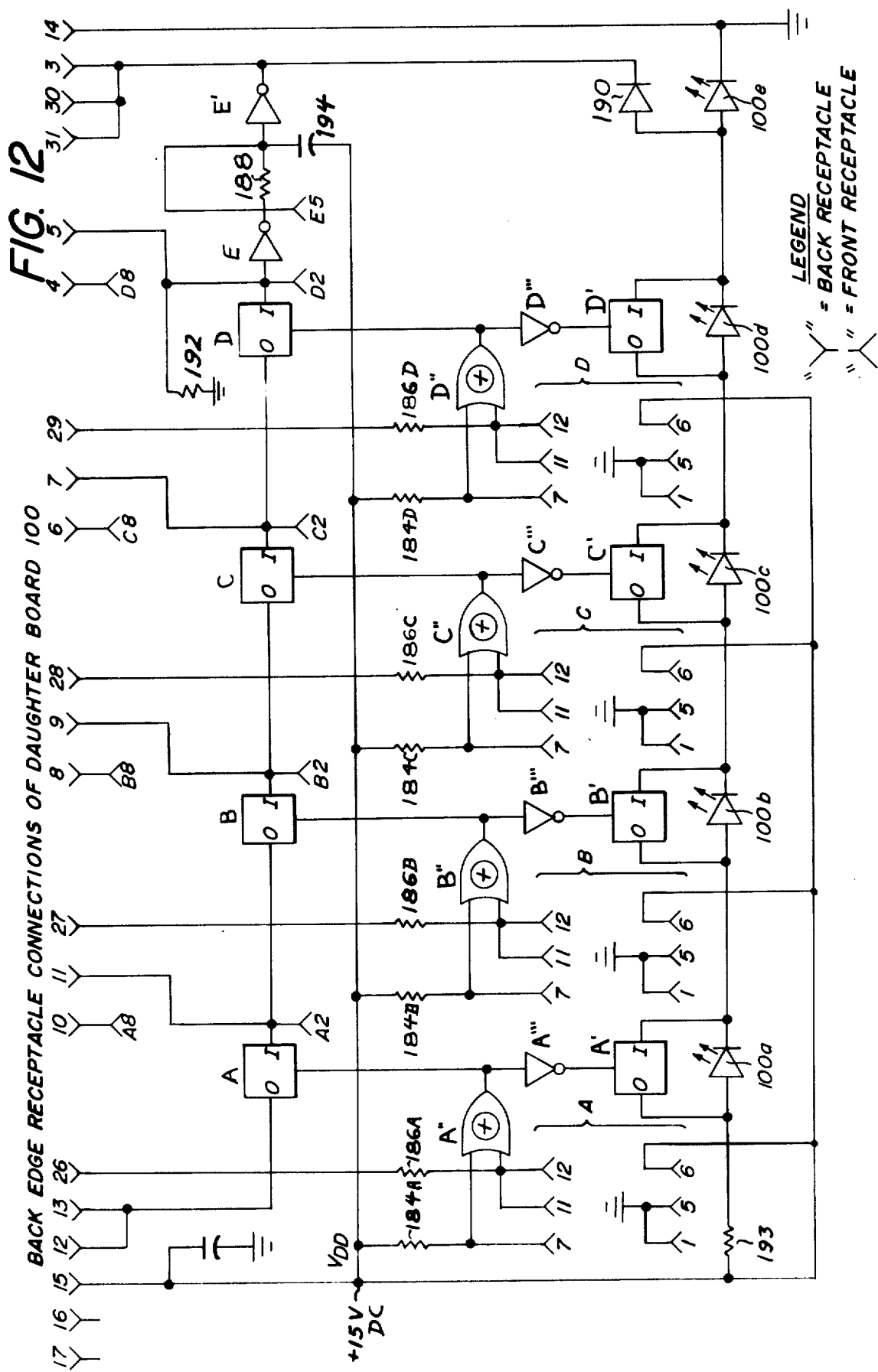

4,171,541

MODULAR PROGRAMMABLE CONTROLLING SYSTEM

BACKGROUND OF THE INVENTION

1. Field of the Invention

This invention relates to a control system for electrical apparatus and, in particular, to a system which can be manually programmed with relative ease.

2. Prior Art

Formerly, there were available several types of "controllers" useful in controlling the various components of an industrial electrical system. Earlier forms included a number of hard-wired panels arranged in a rack or the like, whose functioning could be changed, but only by relatively laborious, expensive and time-consuming changes in the interconnecting or addressing cables. Moreover, these control systems were relatively large and employed electromechanical components such as relays which use a relatively large amount of power and are subject to well-known problems of mechanical and electrical malfunction.

A later type of controller for this purpose involves a main controller having a number of electromechanical or electrical circuits to whose input the input devices such as push-buttons, limit switches, etc. are coupled and to whose output devices such as the solenoids and motor starters of the field apparatus are coupled. These systems also employ a programming terminal, usually with a display device, which permits the operator so instanteously modify the interconnections on the main controller in accordance with a desired ladder diagram, for example. The ladder diagram is instantaneously shown on the display. While these later systems represent a considerable improvement over the earlier, hard-wired systems, insofar as flexibility and ease of reprogramming are concerned they are quite expensive and beyond the budget of smaller industrial plants.

It is therefore among the objects of the present invention to provide a manually-programmable controller for industrial and other similar applications which is relatively inexpensive, simple to use, yet allows a great diversity of ladder-diagram-equivalent circuits to be changed or programmed with little difficulty. Those changes are immediately symbolized and displayed understandably on the apparatus itself.

Another of the objects of the invention is to provide a low voltage, low power system for programming a controller manually by using modules which are easily plugged into the system for producing a circuit operation therein which corresponds to the symbol on the module, all of the symbols together constituting a conventional ladder diagram of the equivalent operations.

SUMMARY OF THE INVENTION

The modular programmable controlling system comprises logic means which includes a plurality of logic subcircuits and also comprises a plurality of modular means constructed to be interchangeably and releasably coupled to the logic means. Each modular means is also constructed to cooperate, when coupled to said logic means, with an associated one of said subcircuits whereupon said one subcircuit performs a predetermined logic function. The modular means also bears external indicia corresponding to said predetermined logical function. When the modular means are coupled to the logic means, a diagram of the logical function is displayed.

BRIEF DESCRIPTION OF THE DRAWINGS

FIG. 6 is a sectional view of a part of the apparatus shown in FIG. 2 taken along the section line 6—6 in the direction indicated;

FIG. 8A is a two-part fragmentary perspective view of one of the modular elements shown in FIG. 2 showing its cooperation with a part of a "daughter board" which is also shown in FIG. 2;

FIG. 8B is a simplified, diagrammatic plan view of a "daughter board";

FIG. 9 is a simplified, equivalent circuit of a "daughter board";

FIG. 10 is a schematic electrical diagram of a typical "input board";

FIG. 11 is a schematic electrical diagram of a typical "output board"; and

FIG. 12 is a schematic detailed diagram of the logic, connections and receptacles of a typical "daughter board".

OVERALL DESCRIPTION OF THE PREFERRED EMBODIMENT

Figure 1:
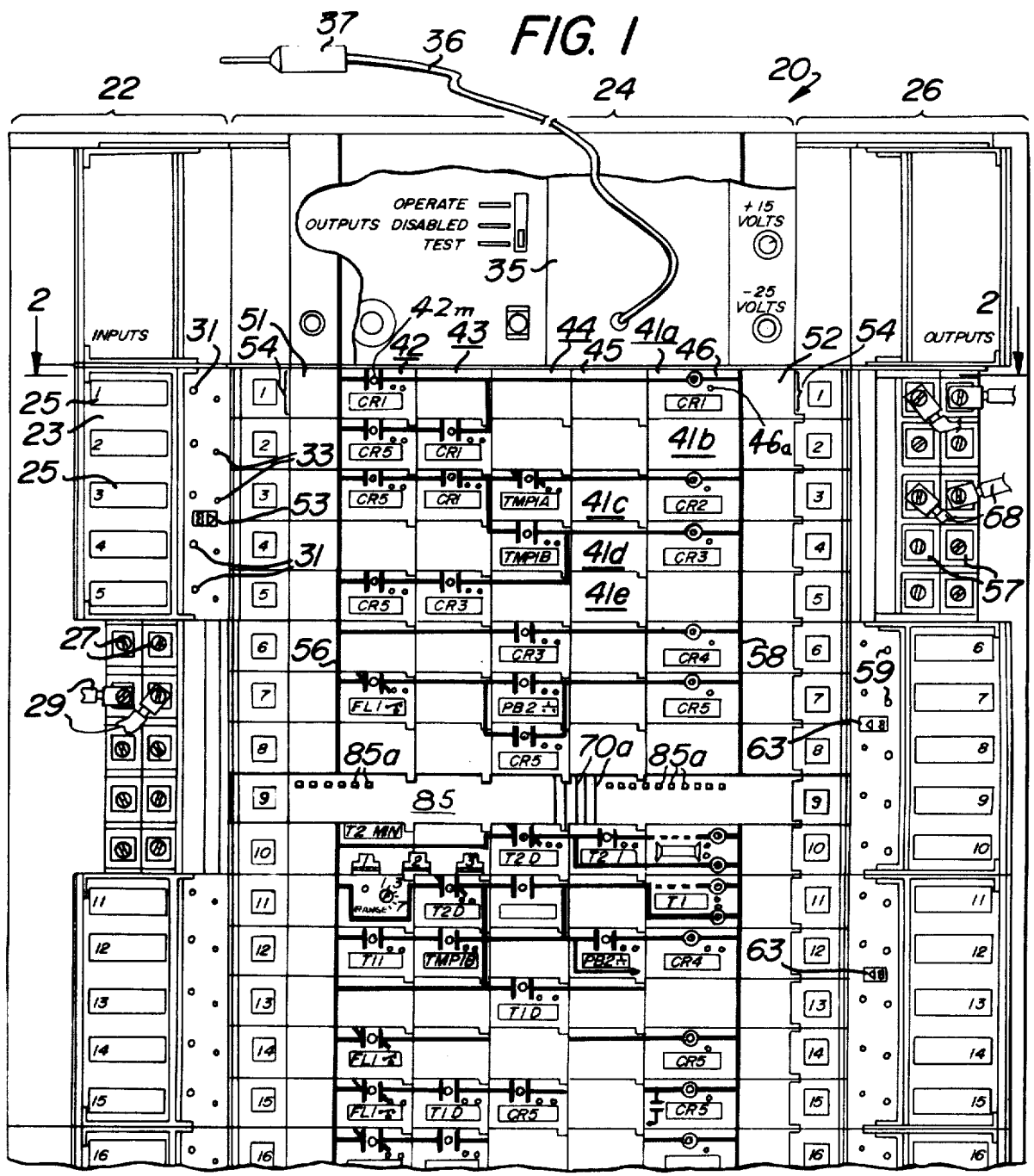
FIG. 1 is a fragmentary front elevational view, partly broken-away of the exterior of one form of the present invention.
Figure 2:
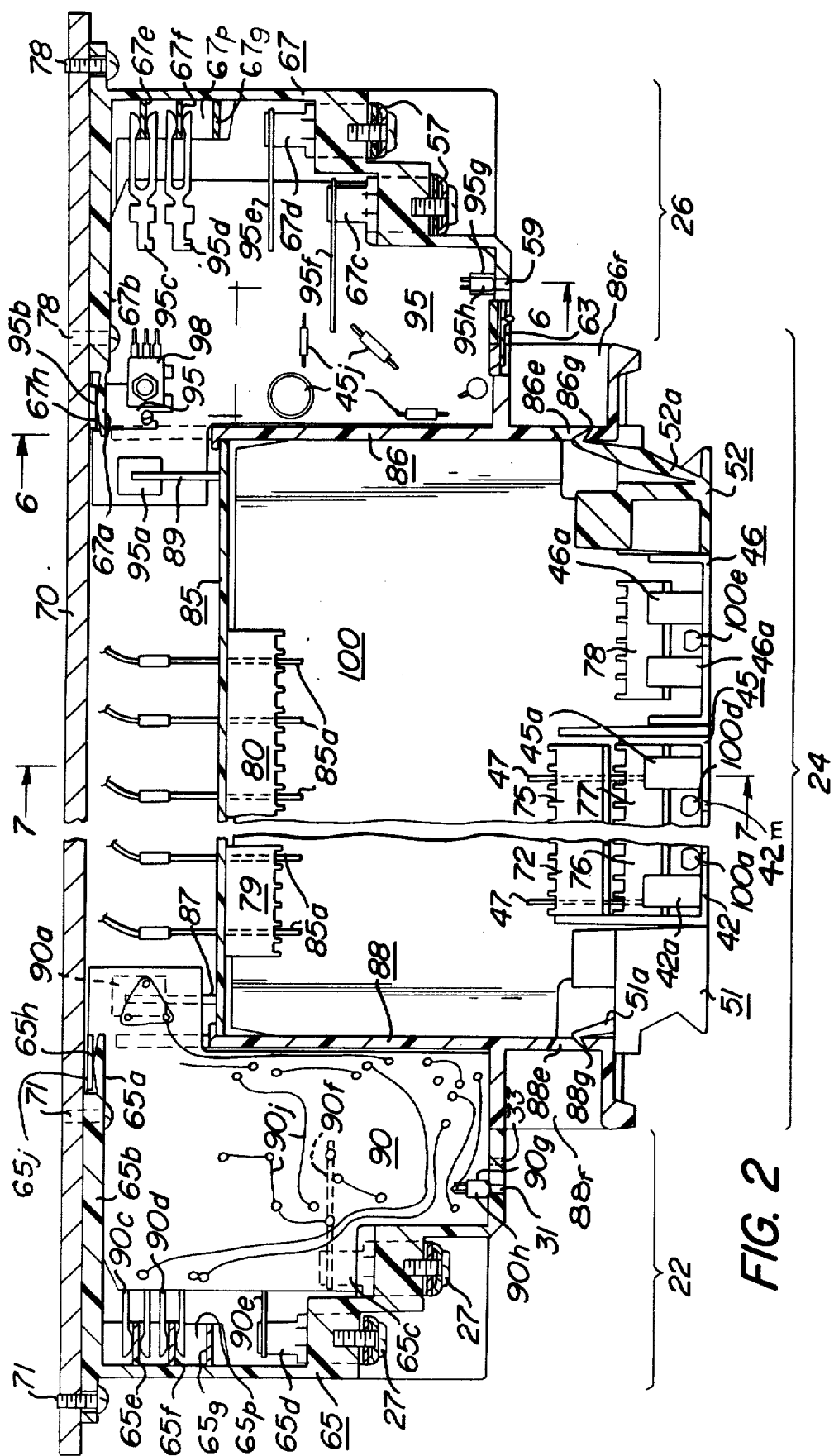
FIG. 2 is a sectional view of the apparatus shown in FIG. 1 taken along the section line 2—2 in the direction indicated.

Referring now to FIGS. 1 and 2 primarily, there is seen a modular, primarily manually-programmable control and indicating system 20 constructed in accordance with the present invention. Generally, it comprises an input section 22 which interconnects with a more centrally-located "logic" section 24 that, in turn, is connected to an output section 26. It is the input section 22 which is to be connected to electrical leads such as leads 29 coming from the relatively high voltage apparatus in the field which is to be controlled. These leads 29 are coupled to screw assemblies 27 that are so constructed as to connect the field devices, via intermediate, electrically isolated circuits, to relatively low-voltage logic circuits in the central section 24. The logic circuits in section 24 are, in turn, connected to circuits in the output section 26 that are electrically isolated from the sets of output screw assemblies 57. The field devices to be controlled, such as motors or valves, are connected to screw assemblies 57 by leads 68.

In the input section 22 there are a number of removable, vertically-spaced horizontal circuit boards 90 called "input boards" which serve to isolate electrically the high voltages of the field devices from the low voltage of the central logic section to which they are coupled.

In the central logic section 24, disposed in a vertical column from top to bottom of the system 20, are a group of logic subassemblies, each being located between correspondingly numbered indicia to the left and right. For example, the logic subassembly 41a is located in the first vertical site 54 (designated by braces) between squares on the front panel which are marked with "1" in them. The logic subassembly 41b is in the vertical site just below the topmost subassembly 41a shown disposed between the numerals "2"; the logic subassemblies 41b, 41c, 41d, and 41e are disposed between pairs of numerals "3", "4", and "5", respectively, etc.

As may be seen with particular reference to FIG. 2., which is further clarified by FIGS. 4, 5, 8A and 8B, the logic subassembly 41a comprises a horizontal "daughter board" onto whose front edge five modular programming units or elements 42, 43, 44, 45, and 46 are pushed. The "daughter" board is a circuit board having various electrical subcircuits mounted in circuit thereon to perform predetermined logic functions. In the embodiment illustrated, these logic functions simulate the "open" or "closed" conditions of relay contacts associated with a relay coil whose action is also simulated thereby. To predetermine the state of a particular subcircuit of the logic circuitry, the modular elements 42–46 have (or do not have) conductive pins 47 which cooperate (or do not cooperate) with the particular subcircuit to induce it to simulate the desired function. Thus the presence of a pin in a first position in the module causes the associated logic subcircuit on the "daughter" board to simulate a "normally open" set of relay contacts, for example, whereas absence of the pin there makes it perform a "normally closed" contact function.

Each module bears on its front a symbol. This symbol, in the case of module 42, represents a normally open set of contacts shown in the same manner as on a conventional ladder diagram. That module is so constructed that when it is pushed onto the front edge of the "daughter board" it acts to cause the particular logic subcircuit on the daughter board to function in a way that simulates a "normally open" contact function, for example. The modules 43, 44, 45 show a simple electrical connection from the module 42 to the module 46. The latter shows a coil symbol on its front and the letters "CR1" indicate that it controls the state of the module 42 which also bears "CR1". It also controls every other contact-simulating module having "CR1" on its front. Thus line 41a shows symbolically what the array of modules 42–46 induces their respective associated logic subcircuits on that "daughter board" to simulate, i.e., a single set of normally open contacts actuated or controlled by a relay coil. Similarly, line 41b contains two left modules bearing symbols representing two normally open sets of contacts in series, that series being in parallel with module 42 of line 41a. The vertical lines 56 and 58 representing "L1" and "L2" are permanently placed on left and right portions 51 and 52 of all of the logic subassembly lines (hereinafter "lines") 41a, 41b, 41c, etc. to complete the schematic ladder diagram representation.

The daughter boards are all plugged into a vertical mother board 85 (FIGS. 1, 2 and 3) located adjacent their rear edges. The mother board has a number of front horizontal pins 85a which engage receptacle blocks 79, 80. It also has a number of rearwardly extending fork connectors 87 which couple it to the input boards 90 by means of staples 90a (FIG. 4). The mother board is also connected via fork connectors 89 to the "output boards" 95 by means of staples 95a, the output boards being vertically spaced in the output section 26.

These ladder-step equivalent logic subassemblies 41a, 41b, etc are respectively coupled, via connections on the mother board 85, to a number of vertically spaced, horizontal "output boards" 95 in the output section 26. These boards 95 are isolating circuits which convey, via optically-coupled, electrically isolated circuits, signals from the low voltage central logic section 24, out to the higher-voltage field devices such as valves, motors, etc.

The control and display system has an internal test facility shown as a test probe 37 connected to wire 36 that proceeds from a test signal generator indicated generally at numeral 35. The probe 37 is adapted to plug into test holes 33 (FIG. 1) and 46a (FIG. 1) of the module 46 or any other module which, with its associated logic subcircuit on the daughter board 100, simulates a coil.

Condition lights 90h are disposed in the front edges 90g of the input boards 90 behind the holes 31 (FIGS. 1 and 2) and lights 95h are similarly located on output boards 95 behind holes 59. Condition lights 100a–100e are disposed on the front edge of the daughter board 100 so as to shine behind the central apertures 42m of those modules representing sets of contacts or representing a coil function.

The front panel (FIG. 1) is also equipped with hinged doors or covers 23 on the left and right input and output sections. These doors cover the sets of screws 27 and 57 respectively and have numbered rectangular spaces 25 on which a brief printed identification of the input or output may be placed.

It will be noted that the logic subassembly or "line" at vertical site "9" is missing. It has been removed to show part of the front surface of the mother board 85 and because the lines below that one at sites 10–16 are not operative but merely "spares". They are really just stored there and are not energized because the withdrawal of the "line" at "9" prevents energization of any daughter board below that point consistent with the absence of the L1 and L2 representative lines 56 and 58.

GENERAL PHYSICAL ASSEMBLY—INPUT AND OUTPUT BLOCKS

The general physical assembly of the apparatus 20 is shown and will be explained with particular reference to FIGS. 1, 2, 6 and 7.

Input and output sections 22 and 26 throughout the system 20 are generally symmetrical. Each section is composed of a number of vertically-stacked, contiguous input (or output) blocks, 65 (or 67) each capable of holding five input (or output) boards 90 (or 95). As a matter of fact, each of the input blocks 65 is identical to the output block 67 except that the latter are mounted upside down relative to the former. As shown in FIG. 6, each output block 67 has aligned sets of rear tracks 67m and front tracks 67n into which five horizontal output boards respectively are slid. Of course, the corresponding tracks or guides in the input block 65 accommodate respective ones of the horizontal input boards 90. Mounted to the inner surface of the outer side wall of each block 67 are three vertical rectangular metallic strips 67e, 67f and 67g. The input block has corresponding strips 65e, 65f and 65g.

The output and input blocks 65 and 67 are fastened to a metallic vertical planar member 70 by means of screws 78 and 71 respectively. The buss strips 67e, 67f, and 67g (and 65e, 65f and 65g) are maintained in place by passing through lateral openings in ridges 67p formed in the outer sidewall of output block 67 and in ridges 65p in input blocks 65. Each vertical strip has portions 67r angled with respect to the plane of the strips thereby preventing their movement either upward or downward after having once been inserted edgewise through the ridges 67p. The strips 67e, 67f and 67g of each block 67 (FIG. 6) are conductively joined to the corresponding, aligned strips 68 of the next higher block by means of metallic connectors 69 slipped over the lower ends of the upper strips and the upper ends of the lower strips 67e, 67f and 67g. Input blocks 65 have a similar arrangement but are not specifically shown.

In FIG. 6, the tabs 67c and 67d that are connected to the outer sets of screws 57 (FIG. 2) are shown coming out of reenforced plastic portions of the front wall of the block 67. The horizontal connecting forks 95e and 95f of output board 95 clamp the tabs 67d and 67c respectively. This establishes contact between the output board 95 shown mounted in the fourth vertical site of the output block 67 and the outer sets of screws 57 shown in FIG. 2. The LED shown at the numeral 95h is positioned just behind the opening 59 in the front wall of the block 67.

The back wall 67b has clearances 67s behind portions 67a. When there is a circuit component on the output board such as component 98 which generates considerable heat, this heat is dissipated by bringing it into heat-exchanging contract with an L-shaped metallic member 95b. The vertical portion of member 95b, when the board 95 is inserted into its tracks or channels 67m, 67n, slips behind the plastic portion 67a whose shape is such as to bias the vertical portion into intimate contact with the heat-dissipating metal sheet 70 which acts as a heat sink. The input block 65 has a vertical metal strip 65j that is positioned in the clearance between the metal sheet 70 and plastic portions 65a. Since all output boards contain the L-shaped metallic member 95b, they are prevented from being accidentally plugged into the input block by the blocking action of strip 65j whereas input boards do not encounter any interference therefrom.

Figure 3:
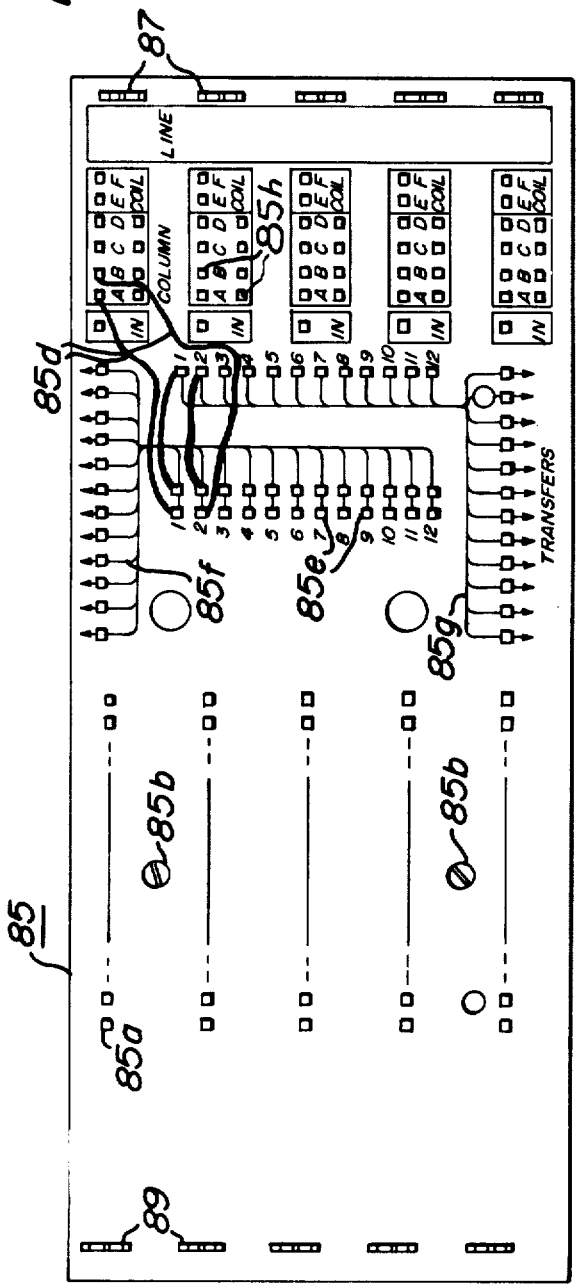
FIG. 3 shows the back side of a "mother board" which is part of the apparatus shown in FIGS. 1 and 2.
Figure 5:
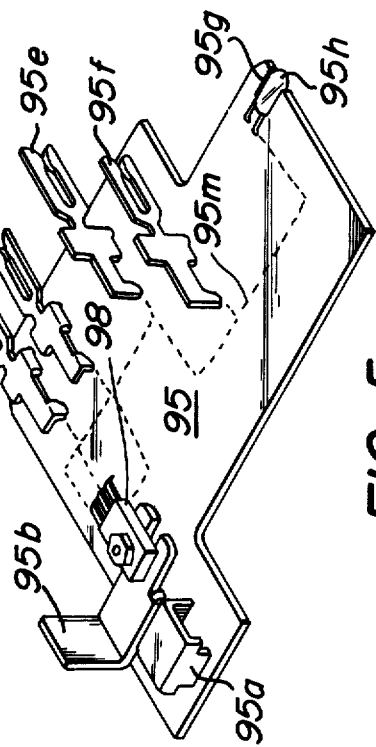
FIG. 5 is a perspective view of the upper side of an "output board" which is also shown in FIG. 2.
Figure 4:
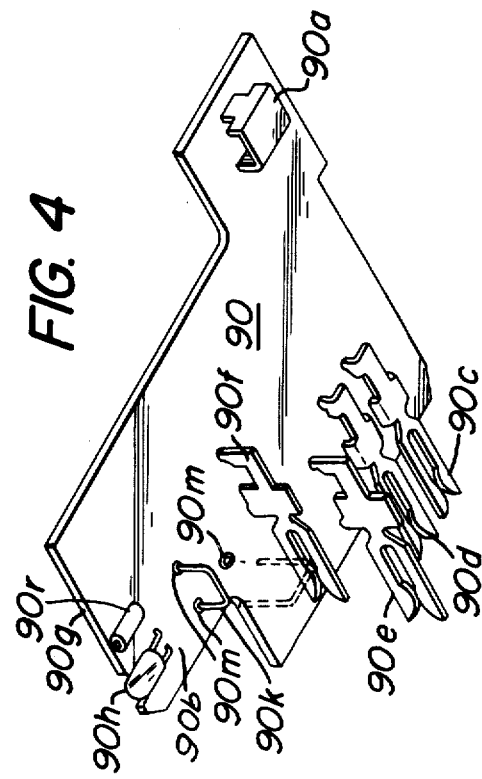
FIG. 4 is a perspective view of the under side of an "input board" whose upper side is also depicted in FIG. 2.

General Assembly—Logic Subassembly Carrier (FIGS. 2 and 3)

The daughter boards 100 are slid into a logic subassembly carrier comprising a left member 88 and a right member 86 which are identical except for the fact that the member 86 is inverted with respect to the member 88. Each of the members 88, 86 has formed on its inside surface, as may be seen by the view of the member 86 in FIG. 7, a number of horizontal tracks 86k into which the side edges of the daughter board are slid. The carrier has provision for five of such tracks and, for stability, has disposed between three of the daughter boards, horizontal metal dividing plates 86n and 86o which are affixed at their side edges to the members 88 and 86 by means of screws 84 which pass inwardly into engagement with the edges through holes in the members 88, 86. The mother boards 85 is also fastened to the rear long edge of the plates 86n, 86o by means of screws 85b (FIG. 3) passing forwardly through holes in the mother board which are aligned with the rear edge of the plates 86n, 86o. The plates are spaced at their midpoints along their lengths by vertical plastic spacers (not shown) having horizontal grooves into which the plates are slit to their respective central portions from flexing. These spacers are also provided with horizontal grooves to engage the central portions of the daughter boards 100 when they are slid back into contact with the mother board. It should be noted that the members 88, 86 have vertical rectangular channels formed toward their five edges (FIG. 2) which are just large enough to accommodate the forefingers (except the thumb) of a person's left and right hand whereby the whole bank of five daughter boards may be withdrawn from their plug-in relationship to the pins 85a and staples 90a and 95a in a single pull. The carrier ordinarily is prevented from forward movement by a set of sliding retainers 53 and 63 (FIGS. 1 and 2) that are mounted in the input and output blocks 65 and 67 respectively.

When the carrier is in place and the retainers 53 and 63 are slid toward the center to lock blocks 65 and 67, one can remove any selected ones of the daughter boards 100 from the carrier. This is accomplished by placing the index fingers of the left and right hands respectively just behind the front portions 51 and 52 and pressing inwardly on the members 51a and 52a (FIG. 2) until the hooked portions 88g and 86g are respectively free of openings 88e and 86e in the members 88 and 86. The portions 51 and 52 are fixed by adhesives or other appropriate means to the left front and right front corners of the daughter board 100. Similarly, to insert the logic subassembly line, the index fingers are again pressed inwardly against members 51a and 52a, the board 100 is slid backward to its maximum point and the finger pressure is released thereby allowing those portions to again be hooked into the openings 86e.

Figure 7:
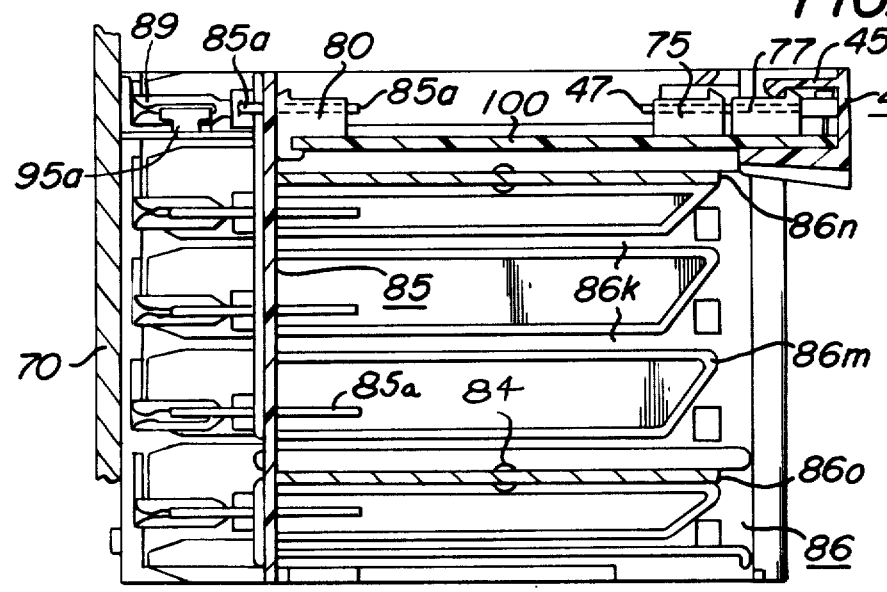
FIG. 7 is a sectional view of part of the apparatus shown in FIG. 2 taken along the section line 7—7.

In FIG. 7 and in FIG. 2, the horizontal fork 89 protruding rearwardly from the mother board 85 slips above and below the staple 95a attached to the output board 95. In FIG. 2, the engagement of the staple 90a on the input board 90 is shown by horizontal fork connector 87. In FIG. 7 and FIG. 2, the engagement of the rear receptacle block 80 by one of the pins 85a fixed in the mother board 85 is also shown.

FIG. 10—Input Board Details

As stated previously, it is the function of the input boards 90 to convert signals at the voltage level of the electrical instruments or devices in the field to the much lower voltage levels employed in the logic circuits on the daughter board 100 which simulate the various ladder diagram components and their functions. Therefore, when the input leads 29 from the field devices are attached to the input section 22 (as shown in FIGS. 1 and 2) by fastening them with the screws 27, and the input board 90 is slipped horizontally into place, the tabs 65d and 65c attached to screws 27 are engaged by the fork connectors 90e and 90f (FIGS. 2 and 4). The terminals 135 may be considered as being the terminals 90e and 90f and they are coupled by the network of resistors 139 and 137 to the full-wave rectifier circuit 143 consisting of the four diodes shown. A capacitor 141 is provided to reduce noise spikes. Across the rectifier circuit 143 is an optically-coupled isolator 146 consisting of a LED 144e and a phototransistor 145. This separates the incoming signal from the field devices on the LED side from the rest of the imput circuitry on the phototransistor side. This separation is deliberate; it effectively isolates the external field voltages from the logic circuitry of the daughter board 100. The right-hand portion of the circuit in FIG. 10 has an output terminal 181 at which either a voltage 0 or a voltage 1 (i.e., a "1" = +15v DC) is made to appear in response to the absence or presence of a corresponding signal at the input terminals 135.

In the absence of a voltage at the input terminals 135, the LED 144 is unlit and the phototransistor 145 is non-conductive. Therefore, there will be a 0 at the input of the inverting amplifier 163, a 1 at its output and, hence, a 0 at the output of inverting amplifier 165. Thus, inverting amplifier 167 will have a 0 on its input and a 1 on its output and inverting amplifier 173 will have a 1 on its input and a 0 on its output. As shown in FIG. 4, a jumper 90k can be placed in one of two positions either connecting the sockets 90m1 and 90m2 or 90m2 and 90m3. If it is as shown in FIG. 10, the output 0 of amplifier 173 is applied directly to the output terminal 181. Conversely, if the jumper 90k is inserted in the 90m2 and 90m3 sockets, the 0 on the output of inverting amplifier 173 becomes converted to a 1 in the output of inverting amplifier 177 and this, instead, is fed to the output terminal 181. Thus, insertion of the jumper 90k determines whether the 181 output is inverted or non-inverted with respect to the voltage at the input terminals 135.

When there is a 1 in the output of amplifier 173, in response to a voltage at input terminals 135, amplifier 175 inverts it so that a 0 is applied to the cathode of the LED 169 (which is the schematic representation for the LED 90h shown in FIG. 2 and FIG. 4 behind the hole 31 in FIGS. 1 and 2). This causes it to become illuminated.

The terminal 90r is the test probe input shown in perspective in FIG. 4. Resistor 159, capacitors 157 and 161, and diode 155 are all put in the circuit for filtering and noise suppression.

Daughter Board Equivalent Circuit—FIG. 9

FIG. 9 generally represents the electromagnetic equivalent circuit of one of the daughter boards 100. It is the daughter board 100 which contains circuitry (whose details will be set forth later in connection with the discussion of FIG. 12) that, in response to the plugged-in programmable modules simulates the function or operation of a conventional ladder type circuit. In FIG. 1, each line such as the line 41a in vertical site 1, has five juxtaposed modules 42, 43, 44, 45 and 46 plugged into one of the daughter boards 100. At each of the five horizontal sites on each daughter board there is the equivalent of a contact-coil combination depicted in FIG. 9 as A-115, B-117, C-119, D-121 and EF-111. The contacts A-D have a broken diagonal line through them indicating that they can be made to simulate either a normally open or normally closed set of contacts. The daughter board itself, as stated previously, is coupled to the +15 volt DC "L1" line by means of a connection of one of the pins 85a (FIGS. 1 and 2) which cooperate with one of the rear edge receptacle blocks 79, 80 (FIG. 2).

Simulated contacts A-D of FIG. 9 can be programmed to be either normally "open" or "closed" by plugging appropriate modules into the front edge of the daughter board 100. The normally open or closed functions are achieved by using modules with corresponding pin structures and symbols. If modules bearing contact symbols are plugged in the corresponding A-D (FIG. 9) pin locations 85h on the mother board 85 (FIG. 3) must be addressed by use of an addressing cable 85d. The addressing cable is connected from an appropriate input or coil to the corresponding A-D pin location 85h. This accomplishes energizing and/or deenergizing of "coils" 115-121 (FIG. 9). A logic "1" (+15v DC) applied to one of the A-D pins causes a "contact" A-D to transfer to its opposite state. For example, if a normally open module is plugged into the front edge of the daughter board, the corresponding one of the A-D pin locations 85h on the mother board must be addressed. If logic 1's are applied to all existing pins A-D, all of the "coils" 115-121 would be energized and therefore all of the associated simulated sets of contact A-D would be closed allowing current to pass through coil EF and out through plug-socket combination 113 to L2 or ground. Socket 113 is part of one of the rear receptacle blocks 79, 80 and its associated plug is one of the pins 85a in the mother board 85. This, then, is the general construction and operation of the circuit in FIG. 9 and its equivalence to the more detailed structure shown in FIG. 12 will now be considered.

Daughter Board Circuit (Detailed)—FIG. 12

In FIG. 12 the layout roughly corresponds to the physical layout as shown in FIG. 8B and its sets of simulated contacts are shown lettered A-D respectively as in FIG. 9. Actually, each simulated set of contacts A-D is a bilateral switch of conventional construction having a terminal 0, a terminal I, and a control input terminal shown schematically at the junction of the vertical line touching the square. Each of the bilateral switches may conduct either from 0 to I, or vice versa. Its normal state, i.e., "open" or "closed" is determined by the signal at its control input which is the output signal produced by its associated exclusive OR logic element A", B", C" or D".

Each of the exclusive OR logic elements A"-D" is so constructed that if the signals at both of its inputs are the same, i.e., both "0's" or both "1's", its output signal will be a zero. On the other hand, if its input signals are dissimilar, its output will be a 1. When its output is a 1 and is applied as a control input to its associated bilateral switch, it will turn that switch on. Conversely, if the output of the exclusive OR circuit is a 0, its associated bilateral switch will be in the open state.

The rear edge receptacle 15 engages an appropriate pin 85a of the mother board 85 and is connected via resistors 184A-184D to one input of each of the exclusive OR circuits A"-D". Since receptacle 15 is at "V_{DD}", i.e., at +15 volts DC, a 1 is applied to each exclusive OR circuit at one input. To the other input of each exclusive OR circuit, there is a back edge receptacle connection 26, 27, 28, and 29 through a set of resistors 186A-186D. Receptacles 26-29 are contained in receptacle block 79 shown in FIG. 8b which are engaged by appropriate ones of the pins 85a that are connected to associated signal sources by means of addressing cables on the back of mother board 85.

If the two input signals to inputs of exclusive OR circuits A"-D" are all dissimilar, the outputs thereof are respective 1's which cause the associated bilateral switches A-D to turn on. Since they are all in series the 1 signal at receptacles 12 and 13 proceeds through to the input of inverting amplifier E whose output is a 0. The 0 goes through resistor 188 to another inverting amplifier E' whose output is therefore a 1. Amplifier E' simulates the action of a coil in a ladder circuit. This 1 signal is then taken off at back edge receptacle connection 3 which, via one of the pins 85a on the mother board 85, is connected to the output utilization circuit.

In order to show that the simulated "coil" E' is on, the LED 100e is simultaneously caused to go on. This is accomplished by the fact that the 1 in the output of E', when applied to the cathode of diode 190 causes it to be biased in the backward direction, so no current flows through it and hence it does not, by virtue of its shunting of LED 100e, prevent current flow through the latter as will now be explained.

Ordinarily, since the anode of LED 100a is attached via resistor 193 to the +15 volt $V_{DD}$ line, the LED's 100a-100e will be energized unless their associated bilateral shunting switches A'-D' are closed. When the exclusive OR amplifiers A"-D" produce respective 1's in their outputs in response to sets of two dissimilar signals applied to their inputs (turning A-D on), their respective associated inverting amplifiers A'''-D''' produce 0's at their outputs which are applied to the respective inputs of the second set of bilateral switches A'-D' which causes them to be open. Each of these switches is in shunt with one of the LED's 100a-100d so that the latter are not shorted and can be energized. When the switches A'-D' are closed, the switches A'-D' will short out their associated LED's 100a-100d turning them off.

When amplifier E' has a one in its output, due to the switches in the A-D chain being closed, the diode 190 is reverse-biased and non-conductive so that it does not short out LED 100e which is therefore energized by the current through 100a-100d. The LED 100e in line 41a is situated on the front edge of the daughter board just behind the central aperture (such as the central aperture 42m of module 42).

If, on the other hand, the output of E' is a 0, as it will be when the chain A-D is open, the diode 190 is forward-biased so that it conducts and shorts out LED 100e which therefore does not light up.

The resistor 192 is the load resistor for the daughter board 100. It is provided so that if switches A-D are all open, the input to amplifier E is kept from floating as would otherwise be the case.

The resistor 188 between E and E' and the capacitor 194 connected to it are provided to introduce an intentional delay to suppress noise spikes.

When a module such as the module 42 shown in FIG. 8A is plugged in, the resilient horizontal catch portions 42a attached to the front wall will initially be cammed upwardly by the inclined portion 76c of receptacle block 76 and then when the module is completely plugged in, the rear portion of 42a will snap downward past 76c thereby releasably securing the module into position. When plugged in, module 42 has a pin 47 in the first (from the left) horizontal position which connects, for example, the front edge receptacles 1 and 7 in module site A (see FIG. 2). Therefore, whereas formerly the top input to the exclusive OR circuit A" was at $V_{DD}$ (+15 volts DC), it now is grounded or a 0. Thus, if the potential applied at rear edge receptacle 26 is a 0, the component A" will produce a 0 at its output causing its associated bilateral switch A to perform as a normally open circuit. In the absence of the pin 47 as shown in FIG. 8A, that same switch A would function as a normally closed set of contacts because the inputs to A" are dissimilar. Withdrawal of module 42 causes the resilient portions 42a to ride up over portion 76c thereby releasing the module from block 76.

Output Board Circuit Details—FIG. 11

FIG. 11 depicts a typical output board 95 for low power. It has an input terminal 158 which is the schematic symbol for ungrounded staple 95a shown in FIGS. 2 and 5. Staple 95a is connected via a fork connector 89 to the mother board 85. The output screws 57 are connected in a separated circuit physically and electrically unconnected to the circuit on the left side of FIG. 11. This physical and electrical separation insulates the logic element potentials on the daughter board 100 from the potentials applied to the output field devices and controls. The separated circuit consists of a fuse 170 and the reed switch 172. The switch 172 is magnetically coupled to the magnetic field generated by passage of current through coil 154 which is in series with the emitter and collector of transistor 166.

The purpose of the circuit of FIG. 11 is to control the switch 172 so that it will close, for example, when there is an input logic 1 at input terminal 158 and vice versa. When a logic 0 is at 158 the NPN transistor 166 will have a 0 applied to its base rendering it non-conductive so that coil 154 will not be energized and reed switch 172 will remain open. When there is a 1 at the input terminal 158, current flows through the emitter-collector circuit of transistor 166, coil 154 is energized and therefore the switch 172 will close. That same current also flows through LED 168 which is in series with the emitter-collector causing LED 168 to be illuminated. LED 168 is the schematic representation of the LED 95h which is physically shown in FIG. 5 and in FIG. 2 behind the opening 159. The diode 156 is provided to protect transistor 166 by absorbing the back EMF generated in the coil 154 when the current through the coil is turned off. Capacitor 152 is a power supply by-pass.

Internal Testing System

System 20 includes an internal test facility for accomplishing two test objectives. The first is to check the relation of signals applied to the input boards 90 with respect to the conditions of the various sets of logic subcircuits on the daughter boards 100 that simulate normally open or normally closed contacts.

The test facility is also provided to enable the testing of a particular coil-simulating logic subcircuit on a daughter board relative to the respective states of those logic subcircuits on the same or other daughter boards 100 which that coil-simulating subcircuit theoretically controls.

Within the block designated at the 35 in FIG. 1, there is provided a test signal oscillator which generates a signal at about 1 Hz. that has an on time of about 0.1 second and an off time of about 0.9 seconds. That signal is applied via probe 37 inserted in aperture 33 into socket 90r (FIGS. 2 and 4).

When the test system is used to probe the input cards it must be borne in mind that there are two modes of operation of the input board depending on the placing of the jumper 90k. When the input board is in the normally open mode and there is a signal voltage applied to it a logic 1 is produced at the output terminal 181 (FIG. 10) of the input board and normally open sets of simulated contacts will have their associated LED's such as 100a flash in synchronism with the LED 90h on the input board. Normally closed simulated contacts on the daughter board will be on through almost the entire cycle because their "on" period is 0.9 seconds out of 1.0 seconds.

On the other hand, if the input board is set for the normally closed mode, a signal voltage applied to its input terminals produces a 0 at its output terminal 181 and normally closed sets of simulated contacts will have their lights blink in synchronism with the LED 90h on the input board. Normally open sets of simulated contacts will have their associated LED's on 0.9 seconds out of 1.0 seconds.

In order to test the functioning of the logic subcircuits simulating the coil in the fifth site toward the right of each line such as line 41a the test probe 37 is inserted in the test hole 46a in the front of the module 46. That logic subcircuit at the fifth site, when properly addressed to other logic subcircuits on that line or on another line which it is to "control" will cause the respective LED's 100a–100d, for example, of those controlled subcircuits to light up. If those of the LED's 100a–100d are behind modules which symbolize normally open contacts, the lights behind their central apertures will blink in synchronism with the light behind the central hole in module 46. On the other hand, as to LED's behind modules symbolizing normally closed contacts, their respective LED's behind their central apertures will blink out-of-phase with the light behind the central aperture of module 46. So, for example, if the test probe 37 is inserted in the test hole 46a of module 46, the light behind module 42 will blink in synchronism therewith as will the lights behind the modules in the second sites on lines 41b and 41c which symbolize normally open sets of contacts "controlled" by the coil-simulating module 46.

Forcing Pins—Overriding Logic Subcircuits

Inspection of FIG. 1 and especially module 42 on line 41a reveals two side-by-side holes to the right of the module 42 representing a set of contacts. Similar holes appear in other contact-symbolizing modules below that module on other lines. No such holes appear in any of the modules, such as modules 46, which cooperate with their associated subcircuits on the daughter board 100 to simulate coil functions.

The pairs of holes in the modules bearing symbols relating to sets of contacts are really the outer openings of passageways formed in the tubular rear projections 42i and 42h of module 42, for example, as shown in FIG. 8A. Those two projections are provided to guide a conductive "forcing pin" having a head at its outer end into one of two places in front edge receptable block 78 (located on associated daughter board 100 as shown in FIG. 8B), for example, into the fifth receptacle marked "E5" on FIG. 12.

The left hole of each pair is the normal or "N" hole; the right one is the reversed or "R" hole. Insertion of the forcing pin overrides the application thereto of any input signal and, depending whether it is in the "N" or "R" hole, forces it to a constant position. If a module cooperates with its associated logic subcircuit to simulate a normally open set of contacts for example, the insertion of the forcing pin in the N hole forces it to its normal state, i.e. to be normally open. Insertion in the R hole forces it to its opposite state, i.e., normally closed. Once a pin is so inserted, whatever changes occur in the coil-simulating subcircuit associated therewith exert no influence upon the state of that "forced" module-subcircuit. This forcing capability is extremely useful in various test procedures or in causing the bypass of a particular logic subcircuit.

General Remarks

It will be noted that in addition to showing the simple normally open and normally closed types of simulated contacts and a simulated coil, FIG. 1 shows a number of other possibilities. For example, in line 41a in the second module site from the left, the module 43 symbolizes a branch-down continuity line to the next line as well as to the "coil" representative module 46. This indicates that while the module 42 is in effective series with the "coil" CR1 module 46, it is, itself, shunted by the two sets of "contacts" for CR5 and CR1 respectively which are in series in the first two module sites on line 41b.

Similarly, special lines consisting of, for example, timing circuits may be employed. A representative line containing a timing circuit is shown, for example, at the vertical site in FIG. 1 marked "10". The first two module site spaces are occupied by a manually settable timer with associated contact-representative modules in the third and fourth module sites. At vertical site "11", there is shown a line containing a multi-range dial timer in the first module site on the left with associated contacts in the second and third module sites.

Special purpose relays may also be employed such as the self-interlocking relay shown in the fourth module site on line "12". Not shown is an associated coil-simulating module which has circuitry providing for an additional "contact". This "contact" is permanently addressed to the coil and hence closed whenever the "coil" is energized.

It should be remembered that the various condition-indicating lamps 100a–100e serve to illustrate the condition of the associated subcircuit. Therefore, when the controller 20 is in operation, the condition lamps give an annunciator type display showing the progress of the processing steps, for example, of being carried out.

In the preferred embodiment pictured in the drawings, the selection or actuation of the associated logic subcircuits on the daughter boards is accomplished by the presence or absence of the linking pin 47 and its location in one of the possible pin sites in each module. As an alternative, paper, plastic, or other dielectric modules could be employed which, instead of making contacts between appropriate conductive points on the daughter board, could by their configuration interupt one or more spring-loaded sets of conductive contacts thereby bringing into operation (or excluding from operation) predetermined specific parts of their associated logic subcircuits. These insulating modules could have insulating tabs which slip through slits in the assembly located toward the front edge of the daughter board. These tabs would have configurations designed to interrupt one or more normally-closed sets of physical contacts connected in the respective associated logic subcircuits. On the front of each module there would be a symbol corresponding to the function performed by its associated logic subcircuit. Provision could be made if desired for an opening in the fronts of selected modules to allow the condition lamps to shine through (or not as the case may be). Alternatively, they could have opaque portions except for a central transparent portion in front of the condition-indicating lamp.

What is claimed is:

1. A system for controlling external utilization devices comprising:
   (a) logic means which includes a plurality of subcircuits, said logic means having an input section thereto adapted to be coupled to external signalling apparatus and an output section adapted to be coupled to said utilization devices, and
   (b) a plurality of passive modular means constructed to interchangeably and releasably engage said logic means, each modular means also being constructed when so engaged to cooperate with one or more of said subcircuits to thereby cause said subcircuit or subcircuits to perform a predetermined logic function, said modular means also bearing external indicia corresponding to said predetermined logical function.

2. The system according to claim 1 wherein each of said modular means has a selected number of elements which become connected to its associated subcircuit when engaging said logic means which causes said associated subcircuit to assume a predetermined one of at least two possible states.

3. The system according to claim 1 wherein said logic means comprises a selected number of logic subassemblies each having a generally planar form and wherein each of said modular means is adapted to be coupled to one of said logic subassemblies by being pushed onto said planar logic subassembly at one of its edges.

4. The system according to claim 3 wherein selected ones of said modular means are equipped with one or more portions that engage its associated subcircuit thereby causing said subcircuit to function in a predetermined one of at least two predetermined modes.

5. The system according to claim 1 wherein said logic subassemblies respectively include a plurality of signalling members corresponding to said subcircuits which indicate the state of the subcircuit associated therewith.

6. The system according to claim 5 wherein selected ones of said modular means are constructed with respective apertures permitting external viewing of the signals from said signalling members.

7. The system according to claim 5 wherein said signalling members are light-emitting devices positioned near an edge of said subassemblies.

8. The system according to claim 1 with the addition of an internal subsystem for testing the performance of said subcircuits.

9. The system according to claim 8 wherein said internal subsystem causes the production of light signals from said logic subcircuits.

10. The system according to claim 3 wherein each of said planar logic subassemblies comprises a circuit board and wherein each of said modular means includes at least one groove or channel into which one edge of said circuit board may be frictionally disposed, said circuit board having at said edge a selected number of receptacles and said modular means having a selected number of elongated conductive members that plug into predetermined corresponding portions of said receptacles.

11. The system according to claim 9 wherein said internal testing subsystem produces an electrical signal at a predetermined frequency, wherein means are provided to apply said signal to selected logic subcircuits at selected points and wherein said applied signal causes said selected logic subcircuits to produce one of at least two light output signals having respectively different frequencies depending upon the normalcy or abnormalcy of the functioning of the associated logic subcircuit.

12. The system according to claim 2 with the addition of means which may be coupled to selected ones of said modular means for overriding the application thereto of any other input signal and for causing it to assume a constant one of said two possible states.

13. The system according to claim 12 wherein said means for overriding includes a first and a second means each adapted to receive a conductive pin, the first of said means causing its associated subcircuit to assume its normal state when engaged by said pin, the second means causing said associated subcircuit to assume the other of its possible states when engaged by said pin.

14. The system according to claim 1 wherein said logic subcircuits are each capable of operating in a plurality of functional modes, wherein said passive modular means are non-circuit means and wherein each modular means causes the one or more of the subcircuits with which it cooperates to perform in a corresponding one of said modes.

15. The system according to claim 14 wherein each of said subcircuits when not cooperating with one of said modular means performs in a mode different from its mode when so cooperating and wherein additional modular means are provided which may be respectively associated with, but not cooperate with, their associated subcircuits, said additional modular means bearing indicia corresponding to said different mode, the indicia on all of said modular means when engaging said logic means together producing an overall graphical representation of the functional operation of said system.

16. The system according to claim 5 wherein an internal subsystem is provided for testing the performance of said subcircuits, said internal subsystem coupleable to and cooperable with said signalling members.

* * * * *